United States Patent [19]
Bean

[11] Patent Number: 5,351,762
[45] Date of Patent: Oct. 4, 1994

[54] LAWN EDGE ADAPTER APPARATUS

[76] Inventor: Robert W. Bean, 4 Melroy Cir., The Colony, Tex. 75056-3541

[21] Appl. No.: 58,146

[22] Filed: May 10, 1993

[51] Int. Cl.⁵ .......................................... A01D 34/47
[52] U.S. Cl. ..................................... 172/17; 56/12.7
[58] Field of Search .......................... 172/13, 15, 17; 56/16.7, 17.5, 17.4, 17.2, 12.7, 16.9

[56] References Cited

U.S. PATENT DOCUMENTS

| | | | |
|---|---|---|---|
| 3,587,749 | 6/1971 | Sauer | 172/15 |
| 4,712,363 | 12/1987 | Claborn | 172/17 |
| 4,803,831 | 2/1989 | Carmine | 56/16.9 |
| 4,891,931 | 1/1990 | Holland | 56/17.2 |
| 4,914,899 | 4/1990 | Carmine | 172/17 |
| 4,981,012 | 1/1991 | Claborn | 56/16.9 |
| 5,029,435 | 7/1991 | Buchanan | 172/17 |
| 5,107,665 | 4/1992 | Wright | 56/12.7 |
| 5,226,486 | 7/1993 | Naiser | 172/17 |

Primary Examiner—Randolph A. Reese
Assistant Examiner—Spencer Warnick
Attorney, Agent, or Firm—E. Michael Combs

[57] ABSTRACT

A weed cutter structure having a handle shaft with a rotary head containing at least one flexible cutter filament thereon, includes a guide assembly mounted to the handle shaft in adjacency to the cutter head, wherein the guide assembly includes a mounting bracket arranged for securement to the handle shaft, and a support bracket fixedly secured to the mounting bracket, with the support bracket having a wheel member. The guide assembly projects from a first side of the handle shaft relative to a second side of the handle shaft mounting a shield housing projection.

2 Claims, 4 Drawing Sheets

LAWN EDGE ADAPTER APPARATUS

BACKGROUND OF THE INVENTION

1. Field of the Invention

The field of invention relates to lawn edging apparatus, and more particularly pertains to a new and improved lawn edge adapter apparatus arranged to provide for a guide assembly to permit ease of trimming of a lawn.

2. Description of the Prior Art

Various whip-type cutter structure for lawns is indicated in the prior art such as exemplified in U.S. Pat. No. 5,048,187. Lawn edging structure is indicated in U.S. Pat. Nos. 3,448,812; 4,979,573; 4,186,239; and 3,624,231.

The instant invention attempts to overcome deficiencies of the prior art by employing a guide assembly arranged for mounting to a mono-filament type weed cutter and in this respect, the present invention substantially fulfills this need.

SUMMARY OF THE INVENTION

In view of the foregoing disadvantages inherent in the known types of lawn edge apparatus now present in the prior art, the present invention provides a lawn edge adapter apparatus arranged to include a guide assembly for rotatably guiding a rotary head of a weed cutter relative to a lawn. As such, the general purpose of the present invention, which will be described subsequently in greater detail, is to provide a new and improved lawn edge adapter apparatus which has all the advantages of the prior art lawn edge apparatus and none of the disadvantages.

To attain this, the present invention provides a weed cutter structure having a handle shaft with a rotary head containing at least one flexible cutter filament thereon, including a guide assembly mounted to the handle shaft in adjacency to the cutter head, wherein the guide assembly includes a mounting bracket arranged for securement to the handle shaft, and a support bracket fixedly secured to the mounting bracket, with the support bracket having a wheel member. The guide assembly projects from a first side of the handle shaft relative to a second side of the handle shaft mounting a shield housing projection.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn edge adapter apparatus which has all the advantages of the prior art lawn edge apparatus and none of the disadvantages.

It is another object of the present invention to provide a new and improved lawn edge adapter apparatus which may be easily and efficiently manufactured and marketed.

It is a further object of the present invention to provide a new and improved lawn edge adapter apparatus which is of a durable and reliable construction.

An even further object of the present invention is to provide a new and improved lawn edge adapter apparatus which is susceptible of a low cost of manufacture with regard to both materials and labor, and which accordingly is then susceptible of low prices of sale to the consuming public, thereby making such lawn edge adapter apparatus economically available to the buying public.

Still yet another object of the present invention is to provide a new and improved lawn edge adapter apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
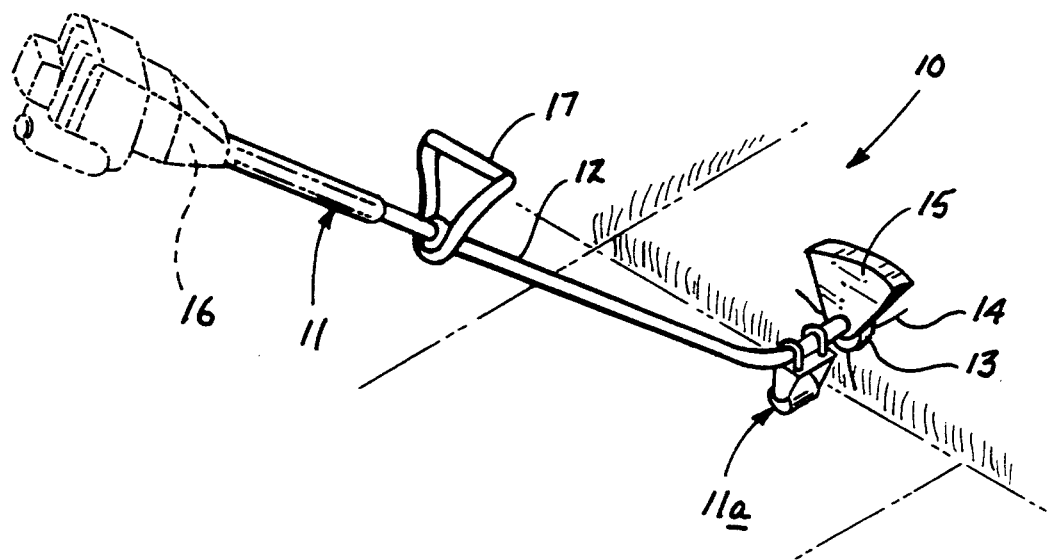
FIG. 1 is an isometric illustration of the invention.
Figure 2:
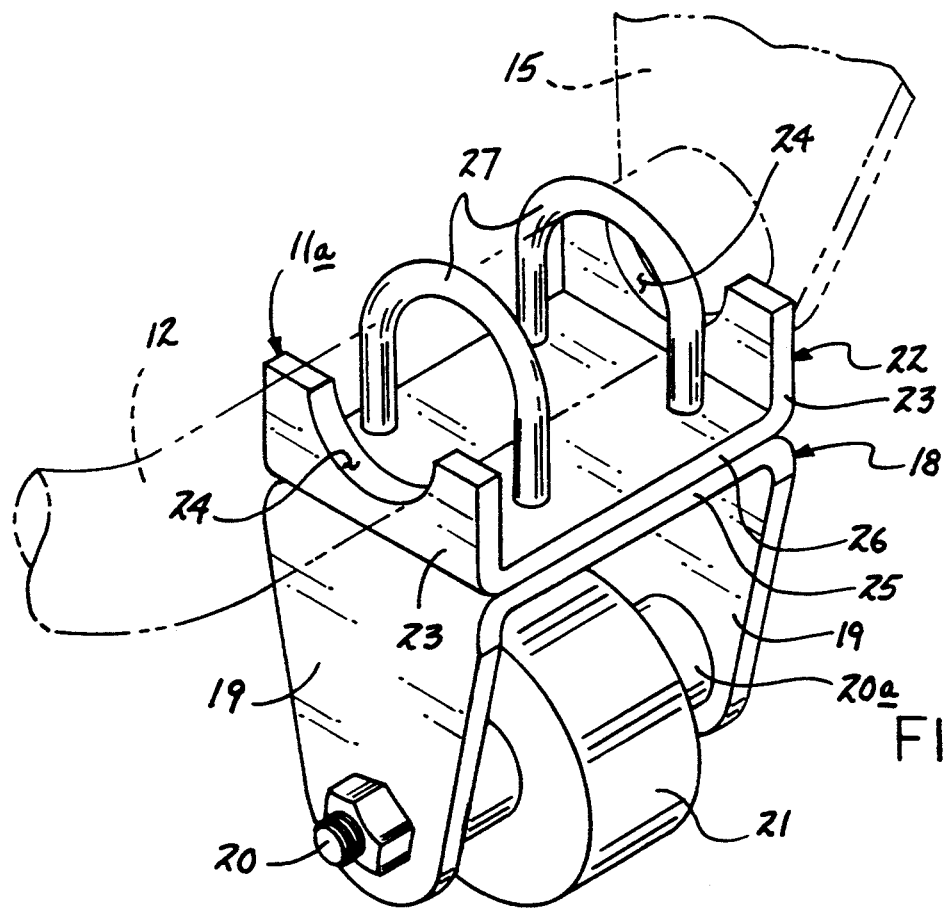
FIG. 2 is an isometric enlarged view of the guide assembly of the invention.
Figure 3:
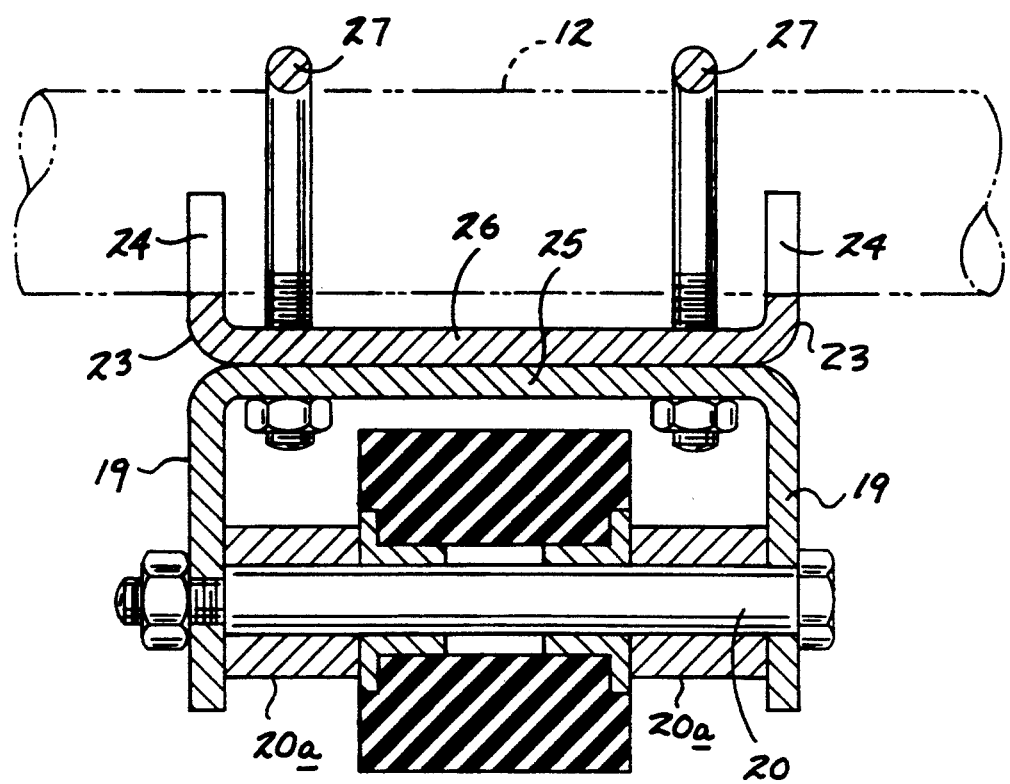
FIG. 3 is an orthographic cross-sectional illustration of the guide assembly, as indicated in FIG. 2.
Figure 4:
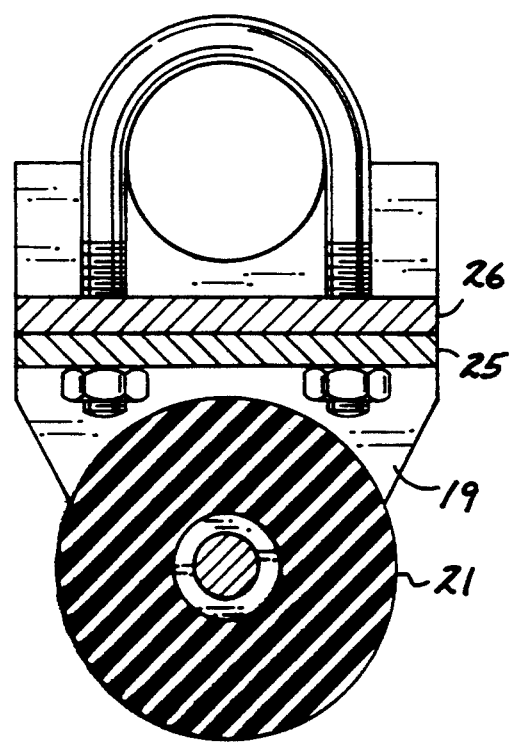
FIG. 4 is an orthographic cross-sectional illustration indicating the orientation of the guide wheel relative to the bracket structure.

With reference now to the drawings, and in particular to FIGS. 1 to 8 thereof, a new and improved lawn edge adapter apparatus embodying the principles and concepts of the present invention and generally designated by the reference numeral 10 will be described.

More specifically, the lawn edge adapter apparatus 10 of the instant invention essentially comprises in cooperation with a weed cutter structure 11 of a whip-type structure, having a handle shaft 12, including a rotary head 13, including at least one flexible cutter filament 14 mounted to the rotary head 13 for effecting severing and cutting of grass, in a manner as indicated and exemplified in the U.S. Pat. No. 4,186,239 incorporated herein by reference. The handle shaft includes a drive motor 16, with a shield housing 15 fixedly mounted to a forward end of the handle shaft 12, with the shield housing 15 oriented as a semi-circular sector projecting from the handle shaft, with a handle 17 mounted to the handle shaft 12 extending orthogonally thereto. A guide assembly 11a is mounted to the handle shaft 12 in adjacency to the shield housing 15 and rotary head 13, as illustrated in FIG. 1. The guide assembly 11a projects orthogonally relative to the handle shaft 12 in a diametrically opposed orientation relative to the shield housing 15, as well as the handle 17. The guide assembly 11a includes a U-shaped support bracket 18 (see FIG. 2) having spaced parallel support flanges 19. The support flanges 19 include an axle 20 extending orthogonally therebetween parallel to a support bracket floor plate 25. A wheel member 21 is mounted intermediate the support flanges 19, having axle spacers 20a positioned on opposed sides of the wheel member 20 to effect proper spacing of the wheel member intermediate the support flanges 19, as illustrated. A U-shaped mounting bracket 22 having spaced and parallel mounting flanges 23 includes a mounting bracket floor plate 26 in contiguous communication with the support bracket floor plate 25, with the spaced parallel mounting flanges 23 orthogonally oriented relative to the mounting bracket floor plate 26, with each of the mounting flanges 23 having a semi-circular recess 24, wherein each recess is coaxially aligned relative to one another to receive the handle shaft 12 therein, and clamp members 27 extending around the handle shaft 12 or mounted fixedly through the support and mounting bracket floor plates 25 and 26, in a manner as illustrated in the FIGS. 3 and 4.

Figure 5:
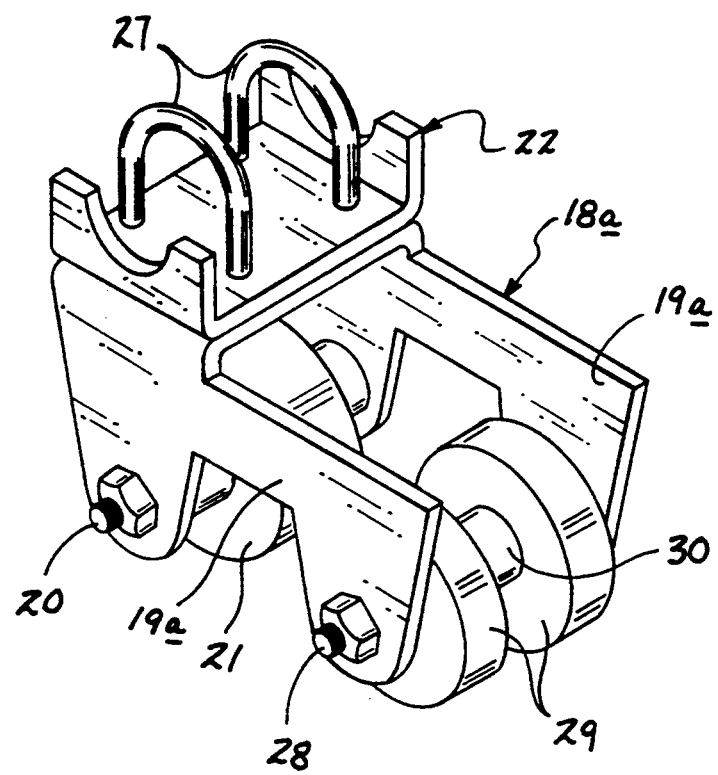
FIG. 5 is an isometric illustration of a modified support bracket structure.
Figure 6:
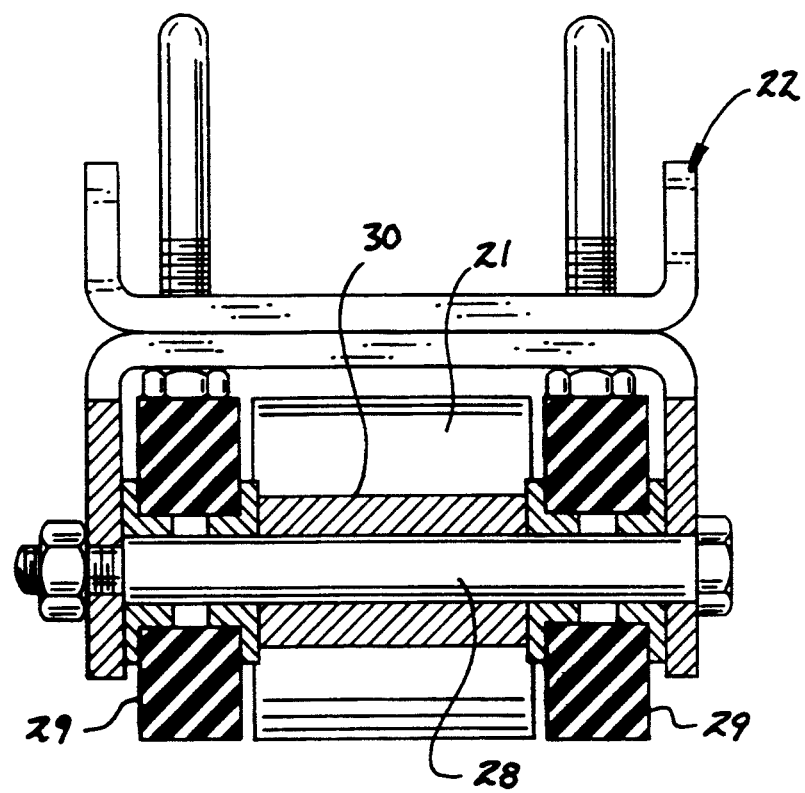
FIG. 6 is an orthographic cross-sectional illustration of the support bracket structure as indicated in FIG. 5.

The FIGS. 5 and 6 indicates the use of a modified U-shaped support bracket 18a, having modified support flanges 19a that project orthogonally beyond the mounting bracket 22, as well as orthogonally relative to the handle shaft 12 that is received within the clamp members 27. The modified support flanges 19a include a second axle 28 spaced from and parallel the axle 20, with the second axle 28 having a plurality of second axle wheel members 29 positioned between the modified support flanges 19a and rotatably mounted about the second axle 28, wherein a central spacer cylinder 30 positions the second axle wheel members 29 on opposed sides of the central wheel member 21, in a manner as indicated in FIG. 6, to provide and afford enhanced stability to the organization when directed along an underlying support surface, in a manner as indicated in FIG. 1.

Figure 7:
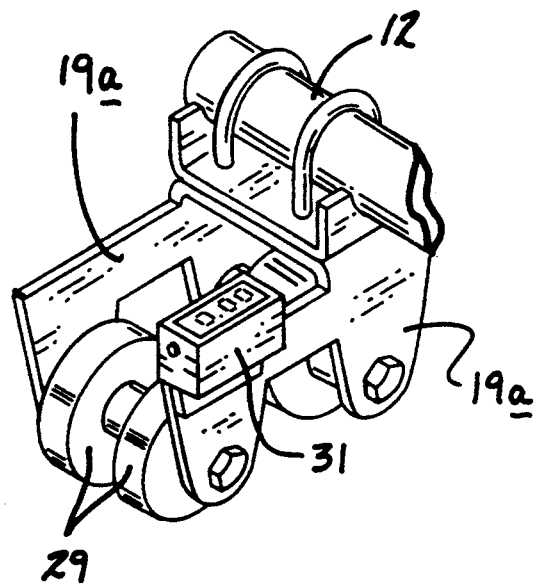
FIG. 7 is an isometric illustration of the modified support bracket structure including a counter assembly.
Figure 8:
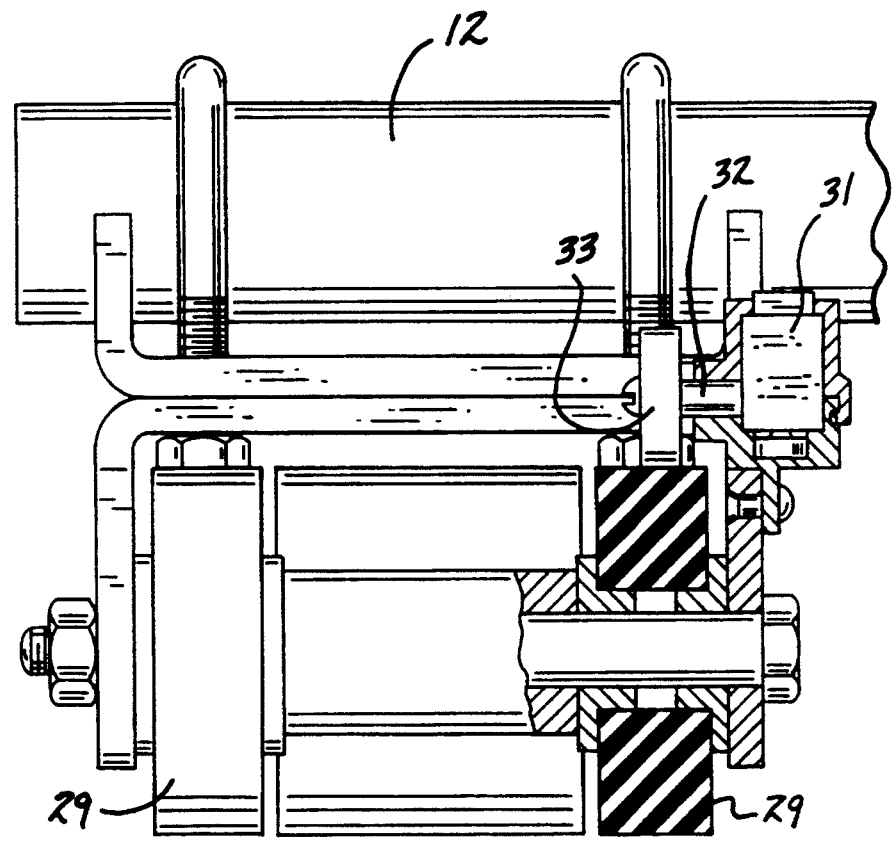
FIG. 8 is an orthographic view of the counter assembly arranged in cooperation with the wheel members.

The FIGS. 7 and 8 further includes a counter housing 31 mounted to one of the modified support flanges 19a, having a counter housing shaft 32 to include a contact counter wheel 33 arranged in rotative communication with one of the second axle wheel members 29 to effect rotation of the contact counter wheel 33, as well as the housing shaft 32, to direct actuation of the counter housing structure 31 to effect counting of linear traverse of the organization in use.

It should be noted that to orient the second axle wheel members 29 on opposed sides of the wheel member 21, the central spacing cylinder 30 is of a predetermined length such that the wheel member of a predetermined width is at least equal to or less than said predetermined length to position the wheel members 29 in a manner to afford greater stability to the organization within the confines of the modified support flanges 19a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn edge adapter apparatus including a weed cutter assembly having a handle shaft, the handle shaft including a handle member extending orthogonally relative to the handle shaft, with the handle shaft including a rotary head mounted at a lowermost end of the handle shaft, with the rotary head including a cutter filament mounted to the rotary head, and a guide assembly mounted to the handle shaft in adjacency to the rotary head, with the guide assembly and the handle member opposed relative to one another relative to the handle shaft, the guide assembly including a wheel member, with the wheel member including an axle, the axle oriented parallel to the handle shaft, and the guide assembly further includes a U-shaped mounting bracket, having a mounting bracket floor plate and spaced parallel mounting bracket flanges, the mounting bracket flanges each include a semi-cylindrical recess to receive the handle shaft in contiguous communication, and at least one clamp member mounted between the mounting bracket flanges extending around the handle shaft and directed through the mounting bracket floor plate, and the guide assembly further includes a support bracket, the support bracket having a support bracket floor plate and spaced support bracket flanges, the support bracket flanges orthogonally mount the axle therebetween, and the axle including an axle spacer positioned on each side of the wheel member in adjacency to a respective one of said support bracket flanges to orient the wheel member intermediate the support bracket flanges, and the support bracket flanges include a a second axle spaced from said axle in parallel relationship, wherein the second axle includes a plurality of second axle wheel members, with the second axle wheel members including a central spacer cylinder therebetween, wherein the second axle wheel members are oriented on opposed sides of the wheel member, said central spacer cylinder having a predetermined length, and wherein the wheel member includes a predetermined width substantially equal to said predetermined length.

2. An apparatus as set forth in claim 1 wherein one of said support flanges includes a counter housing, the counter housing including a counter housing rotary shaft, and the rotary shaft having a counter contact wheel fixedly mounted to the rotary shaft, wherein the contact counter wheel is arranged in contiguous rolling communication with one of said second axle wheel members to an annular periphery of one of said second axle wheel members.

* * * * *